UNITED STATES PATENT OFFICE.

AUGUST BLANK, CARL HEIDENREICH, AND JOHANNES JANSEN, OF LEVERKUSEN, NEAR COLOGNE, GERMANY, ASSIGNORS TO FARBENFABRIKEN VORM. FRIEDR. BAYER & CO., OF ELBERFELD, GERMANY, A CORPORATION OF GERMANY.

COTTON-DYESTUFFS.

1,087,430.  Specification of Letters Patent.  Patented Feb. 17, 1914.

No Drawing.  Application filed April 1, 1913.  Serial No. 758,114.

*To all whom it may concern:*

Be it known that we, AUGUST BLANK, CARL HEIDENREICH, and JOHANNES JANSEN, doctors of philosophy, chemists, citizens of the German Empire, residing at Leverkusen, near Cologne-on-the-Rhine, Germany, have invented new and useful Improvements in Cotton-Dyestuffs, of which the following is a specification.

We have found that new and valuable cotton dyes can be obtained by combining two molecules of a diazotized acidyldiamin with one molecule of the urea of 2.5.7-aminonaphthol sulfonic acid of the formula:

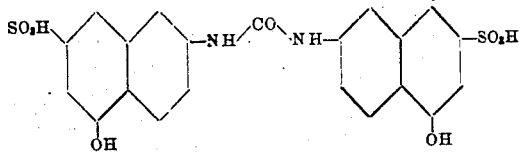

splitting off the acidyl radicals tetrazotizing and coupling the resulting tetrazo compounds with an azo dyestuff component, such as resorcin, a meta-diamin, meta-aminophenol or their derivatives.

The new products dye cotton from red to blue bright shades. The colors are rendered fast to washing by aftertreatment with formaldehyde of fibers dyed with them. They are after being dried and pulverized in the shape of their alkaline salts brownish powders soluble in water and in concentrated sulfuric acid generally with a red to reddish-violet coloration; yielding upon reduction with stannous chlorid and hydrochloric acid the urea of 2.6-diamino-5-naphthol-7-sulfonic acid, a diamin and an amin.

In order to illustrate the new process more fully the following example is given, the parts being by weight:—27.2 parts of meta-aminoformanilid are diazotized with 60 parts of concentrated hydrochloric acid and 13.8 parts of nitrite. The diazo solution is then added to a solution of 54.8 parts of the urea of 2.5.7-aminonaphthol-sulfonic acid (sodium salt) in 2000 parts of water and 40 parts of calcined soda. The mixture is stirred during 12 hours, heated to 90° C. and kept at this temperature during half an hour after the addition of 150 parts of sulfuric acid (40° Bé.). Subsequently the mixture is allowed to cool to 60° C. and the dye is salted out and filtered off. It is then stirred up with 2000 parts of water, rendered slightly alkaline with caustic soda lye, cooled to 10° C., acidulated with 60 parts of hydrochloric acid and 13.8 parts of sodium nitrite and stirred during 6 hours. The mixture thus obtained is then introduced into a solution cooled to zero of 22 parts of resorcin in 1000 parts of water containing 60 parts of calcined sodium carbonate. The mixture is heated to 60–70° C. and the dye is salted out and filtered off. It is after being dried and pulverized in the shape of its sodium salt a brown powder soluble in water with a red coloration, soluble in concentrated sulfuric acid (66° Bé.) with a violet-red coloration. Upon treatment with stannous chlorid and hydrochloric acid it is split up, the urea of 2.6-diamino-5-naphthol-7-sulfonic acid, meta-phenylenediamin and aminoresorcin are obtained. It dyes cotton yellowish-red and has in a free state most probably the formula:

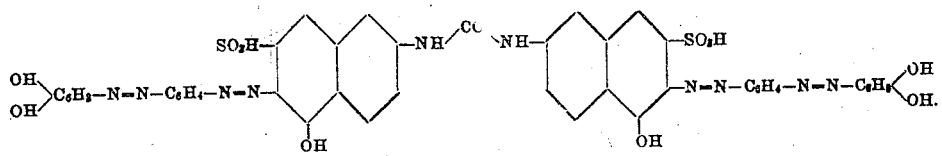

Other diamins, *e. g.* formyl-2.4-toluylenediamin, 4-formyl-2.4-diaminoanisol, para-aminoacetanilid, 2-oxalylamino-5-amino-para-xylol, 2-amino-5-acetylaminotoluene, 2-oxalylamino-4-methyl-5-amino-anisol, acidyl-1.4-naphthylenediamin-6-sulfonic acid etc. Instead of resorcin other components, such as meta-phenylenediamin, meta-aminophenol etc. can be used.

We claim:—

1. The herein described new tetrakisazo dyestuffs derived from the urea of 2.5.7-aminonaphthol-sulfonic acid, aromatic diamin and an azo-dyestuff component, which dyes are after being dried and pulverized in the shape of their alkaline salts brownish powders soluble in water and in concentrated sulfuric acid generally with a red to reddish-violet coloration; yielding upon reduction with stannous chlorid and hydrochloric acid the urea of 2.6-diamino-5-naphthol-7-sulfonic acid, a diamin and an amin; which is after being dried and pulverized in the shape of its sodium salt a brown powder soluble in water with a red coloration and in concentrated sulfuric acid (66° Bé.) with a violet-red coloration; yielding upon treatment with stannous chlorid and hydrochloric acid the urea of 2.6-diamino-5-naphthol-7-sulfonic acid, meta-phenylenediamin and aminoresorcin; and dyeing cotton yellowish-red shades, rendered fast to washing by an aftertreatment with formaldehyde, substantially as described.

and dyeing cotton from red to blue bright shades which are rendered fast to washing by an aftertreatment with formaldehyde, substantially as described.

2. The herein described new tetrakisazo dyestuff having in a free state most probably the formula:

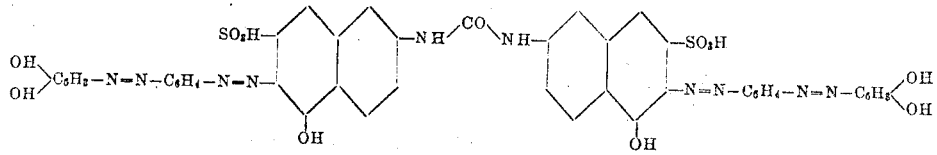

In testimony whereof we have hereunto set our hands in the presence of two subscribing witnesses.

AUGUST BLANK. [L. S.]
CARL HEIDENREICH. [L. S.]
JOHANNES JANSEN. [L. S.]

Witnesses:
 HELEN NUFER,
 DORA NUFER.